US006611908B2

(12) United States Patent
Lentz et al.

(10) Patent No.: US 6,611,908 B2
(45) Date of Patent: *Aug. 26, 2003

(54) MICROPROCESSOR ARCHITECTURE CAPABLE OF SUPPORTING MULTIPLE HETEROGENEOUS PROCESSORS

(75) Inventors: Derek J. Lentz, Los Gatos, CA (US); Yasuaki Hagiwara, Santa Clara, CA (US); Te-Li Lau, Palo Alto, CA (US); Cheng-Long Tang, San Jose, CA (US); Le Trong Nguyen, Monte Sereno, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/884,943

(22) Filed: Jun. 21, 2001

(65) Prior Publication Data

US 2002/0059508 A1 May 16, 2002

Related U.S. Application Data

(60) Continuation of application No. 09/253,761, filed on Feb. 22, 1999, now Pat. No. 6,272,579, which is a division of application No. 08/915,913, filed on Aug. 21, 1997, now Pat. No. 5,941,979, which is a continuation of application No. 08/442,649, filed on May 16, 1995, now Pat. No. 5,754,800, which is a division of application No. 07/726,893, filed on Jul. 8, 1991, now Pat. No. 5,440,752.

(51) Int. Cl.[7] ............................. G06F 13/14; G06F 13/36
(52) U.S. Cl. ............................ 712/29; 710/243; 710/317
(58) Field of Search .............................. 712/1, 28, 29, 712/30, 32, 33, 38; 710/240, 241, 242, 243, 249, 316, 317

(56) References Cited

U.S. PATENT DOCUMENTS

| 4,315,308 A | 2/1982 | Jackson ................... 395/275 |
| 4,482,950 A | 11/1984 | Dshkhunian et al. ....... 395/800 |

(List continued on next page.)

FOREIGN PATENT DOCUMENTS

| DE | 3931514 A1 | 3/1990 | ........... G06F/13/40 |
| EP | 0 205 801 A1 | 12/1986 | ........... G06F/13/24 |
| EP | 0 214 718 A2 | 3/1987 | ............. G06F/9/44 |
| EP | 0 222 074 A2 | 5/1987 | ........... G06F/13/36 |
| EP | 0 319 148 A2 | 6/1989 | ........... G06F/12/08 |
| EP | 0 348 076 A1 | 12/1989 | ........... G06F/13/26 |
| JP | 02-71357 | 3/1990 | ........... G06F/15/16 |

OTHER PUBLICATIONS

Agarwal et al., "April: A Processor Architecture for Multiprocessing," *IEEE*, 1990, pp. 104–114.

Corsini, P. et al., "Architecture of the MuTeam System," *IEEE Proceedings E. Computers & Digital Techniques*, vol. 134, No. 5, Sep. 1987, Stevenage, Great Britain, pp. 217–227.

Earnshaw, W., "The N4—A High Performance Three Dimensional Multiprocessor Computer System," *IRE WESCON Convention Record*, vol. 32, No. 29/2, Nov. 1988, North Hollywood, U.S., pp. 1–8.

(List continued on next page.)

*Primary Examiner*—Dung C. Dinh
(74) *Attorney, Agent, or Firm*—Sterne, Kessler, Goldstein & Fox P.L.L.C.

(57) ABSTRACT

A memory control unit for controlling access, by one or more devices within a processor, to a memory array unit external to the processor via one or more memory ports of the processor. The memory control unit includes a switch network to transfer data between the one or more devices of the processor and the one or more memory ports of the processor. The memory control unit also includes a switch arbitration unit to arbitrate for the switch network, and a port arbitration unit to arbitrate for the one or more memory ports.

12 Claims, 9 Drawing Sheets

U.S. PATENT DOCUMENTS

| | | | | |
|---|---|---|---|---|
| 4,597,054 A | | 6/1986 | Lockwood et al. | 395/729 |
| 4,719,569 A | | 1/1988 | Ludemann et al. | 395/729 |
| 4,829,467 A | | 5/1989 | Ogata | 395/732 |
| 4,916,604 A | | 4/1990 | Yamamoto et al. | 395/457 |
| 4,991,081 A | | 2/1991 | Bosshart | 364/200 |
| 5,089,951 A | | 2/1992 | Iijima | 395/275 |
| 5,097,409 A | | 3/1992 | Schwartz et al. | 395/425 |
| 5,140,682 A | | 8/1992 | Okura et al. | 395/457 |
| 5,148,533 A | | 9/1992 | Joyce et al. | 395/425 |
| 5,222,223 A | | 6/1993 | Webb, Jr. et al. | 395/467 |
| 5,226,125 A | | 7/1993 | Balmer et al. | 395/325 |
| 5,261,057 A | | 11/1993 | Coyle et al. | 395/275 |
| 5,283,903 A | | 2/1994 | Uehara | 395/726 |
| 5,301,278 A | | 4/1994 | Bowater et al. | 395/275 |
| 5,303,382 A | | 4/1994 | Buch et al. | 395/732 |
| 5,430,884 A | * | 7/1995 | Beard et al. | 712/3 |
| 5,436,869 A | | 7/1995 | Yoshida | 365/230.02 |
| 5,440,752 A | | 8/1995 | Lentz et al. | 395/800 |
| 5,471,592 A | * | 11/1995 | Gove et al. | 709/201 |
| 5,666,494 A | | 9/1997 | Mote, Jr. | 711/167 |

OTHER PUBLICATIONS

Johnson, M. "Superscalar Microprocessor Design," Prentice–Hall, Inc., 1991, (in its entirety).

Popescu, V. et al., "The Metaflow Architecture," Metaflow Technologies, Inc., Jun., 1991.

Slater, M., "AMD 2862x combines $Z_86$ and PC system logic," *Microprocessor Report,* Oct. 3, 1990, vol. 4, No. 17 p1(4)—full text copy.

Slater, M., "386 SL brings 386 power to notebook computers," *Microprocessor Report,* Oct. 17, 1990, vol. 4, No. 18 p1(6)—full text copy.

Weiss, R., "Third–Generation RISC Processors," *On Special Report,* Mar. 30, 1992, pp. 96–108.

Hennessy et al., "Computer Architecture: A Quantitative Approach," Morgan Kaufman Publishers, Inc., 1990 (in its entirety).

* cited by examiner

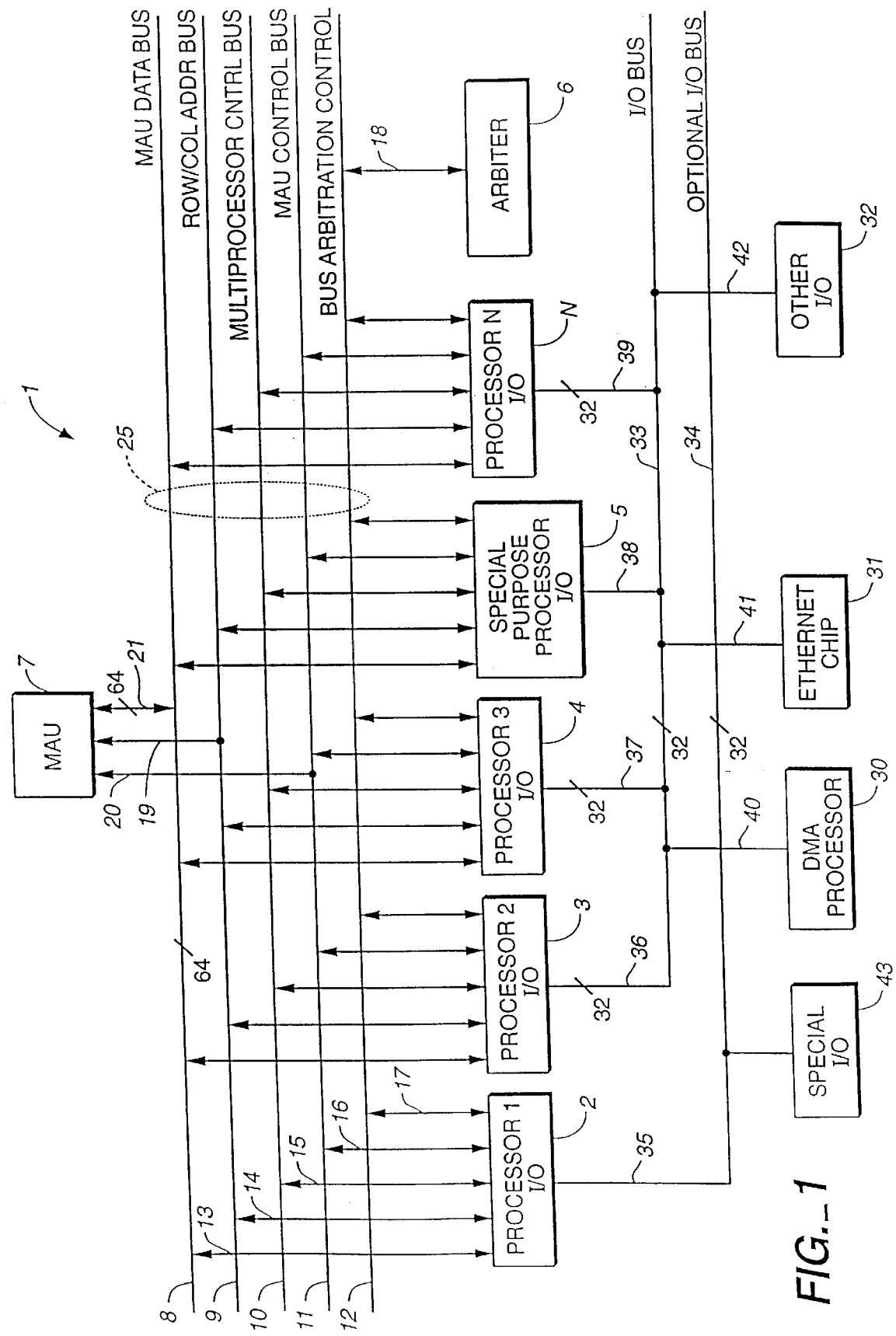
FIG._1

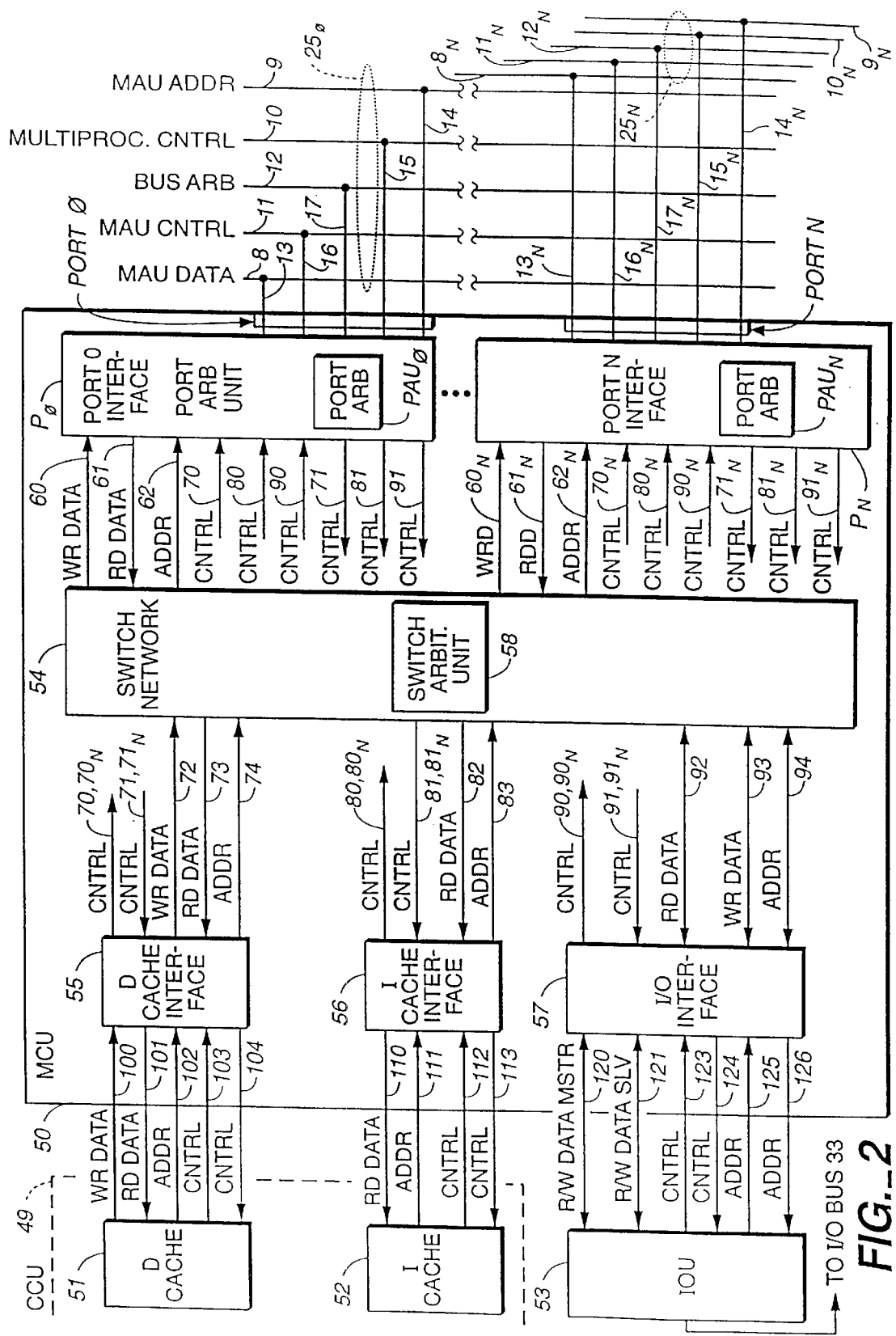
FIG._2

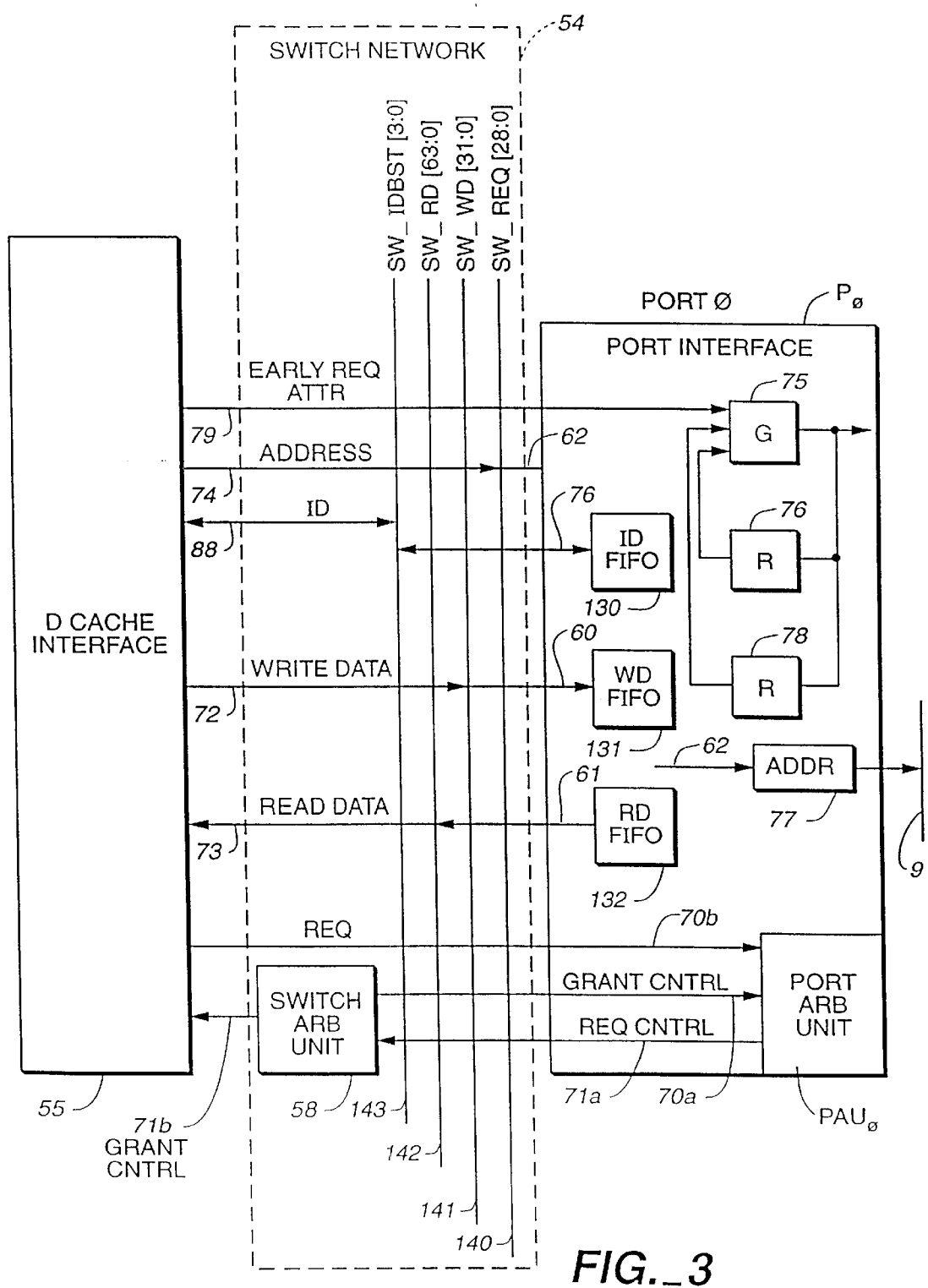
FIG._3

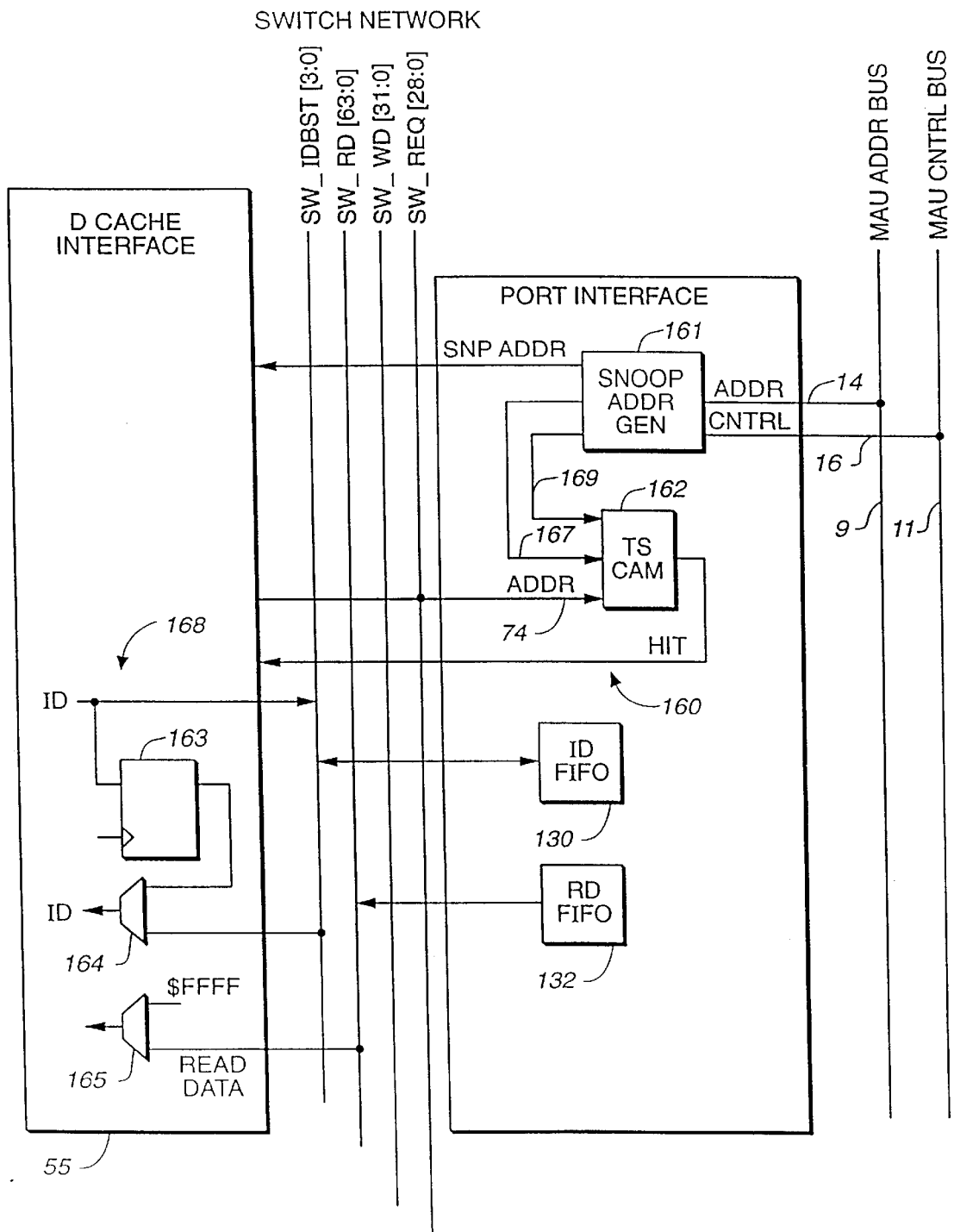
FIG._4

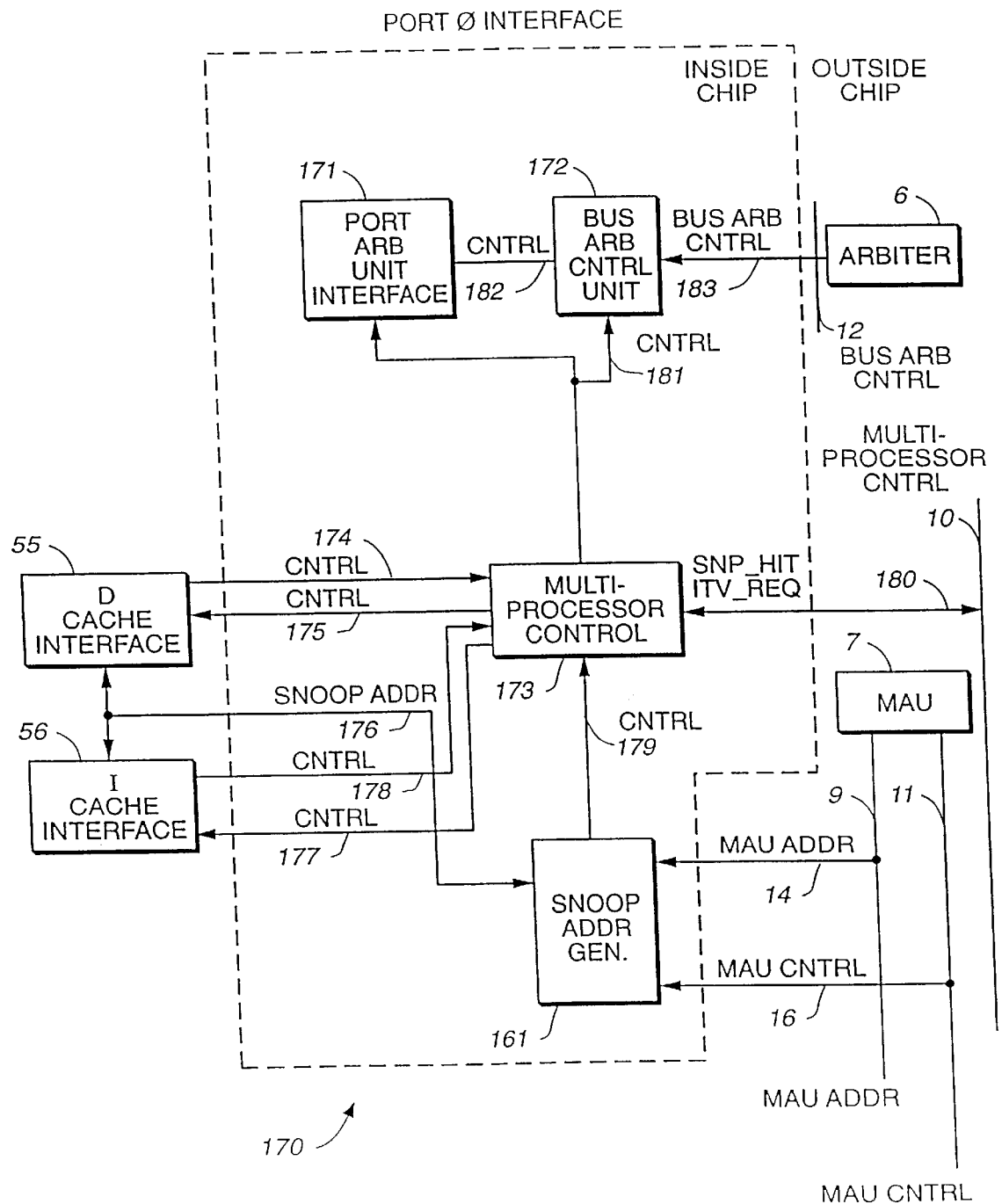
FIG._5

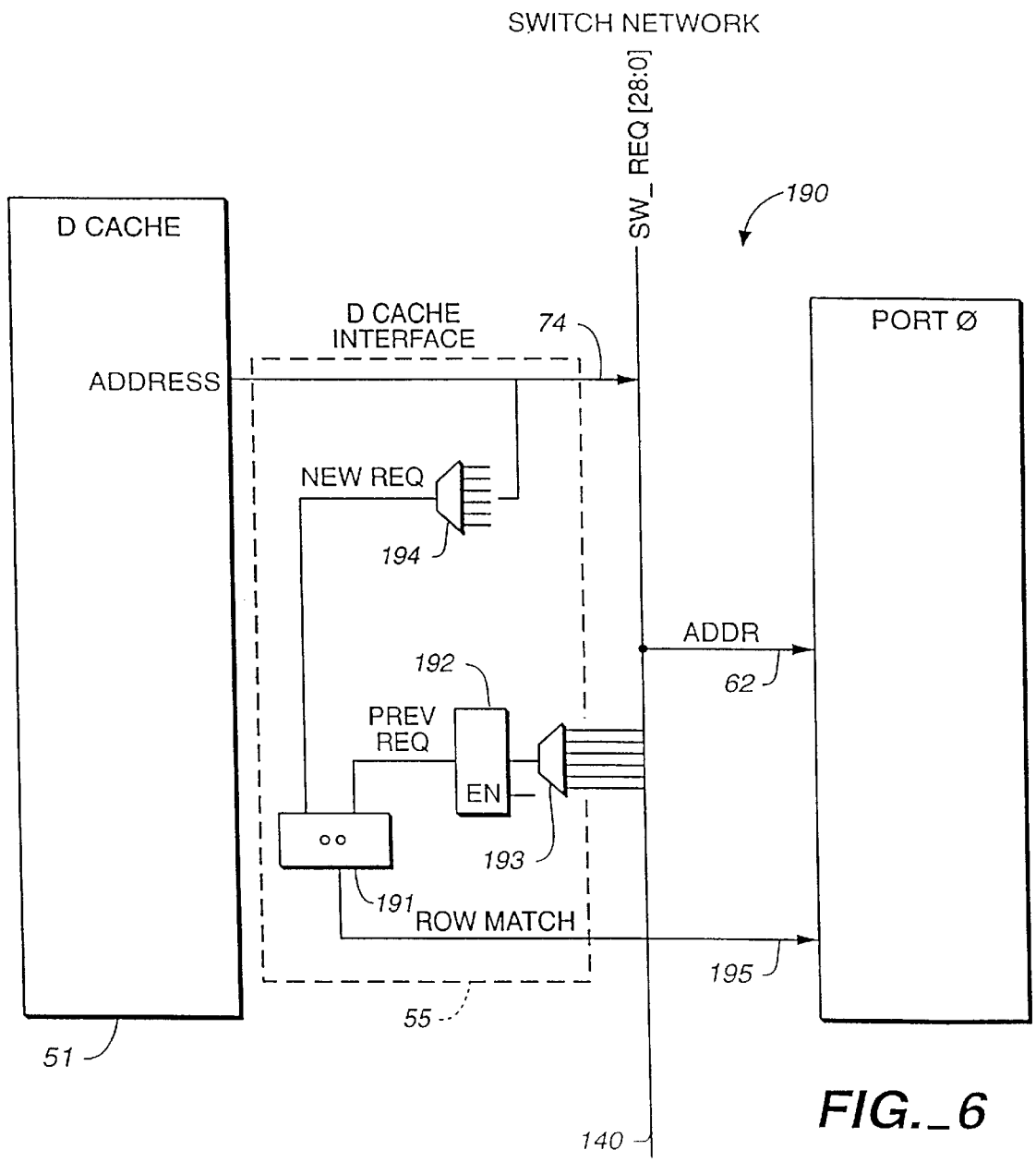
FIG._6

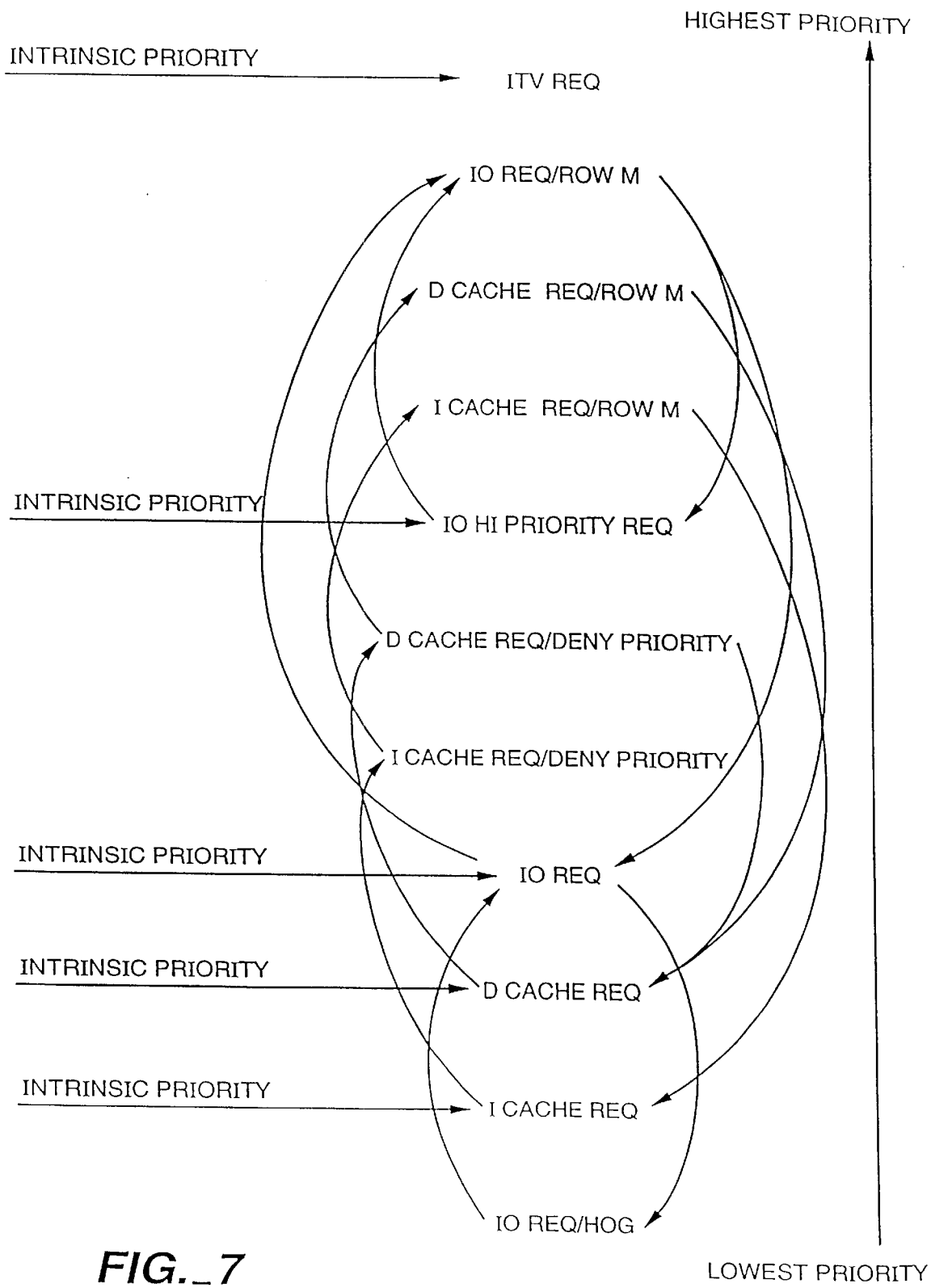
FIG._7

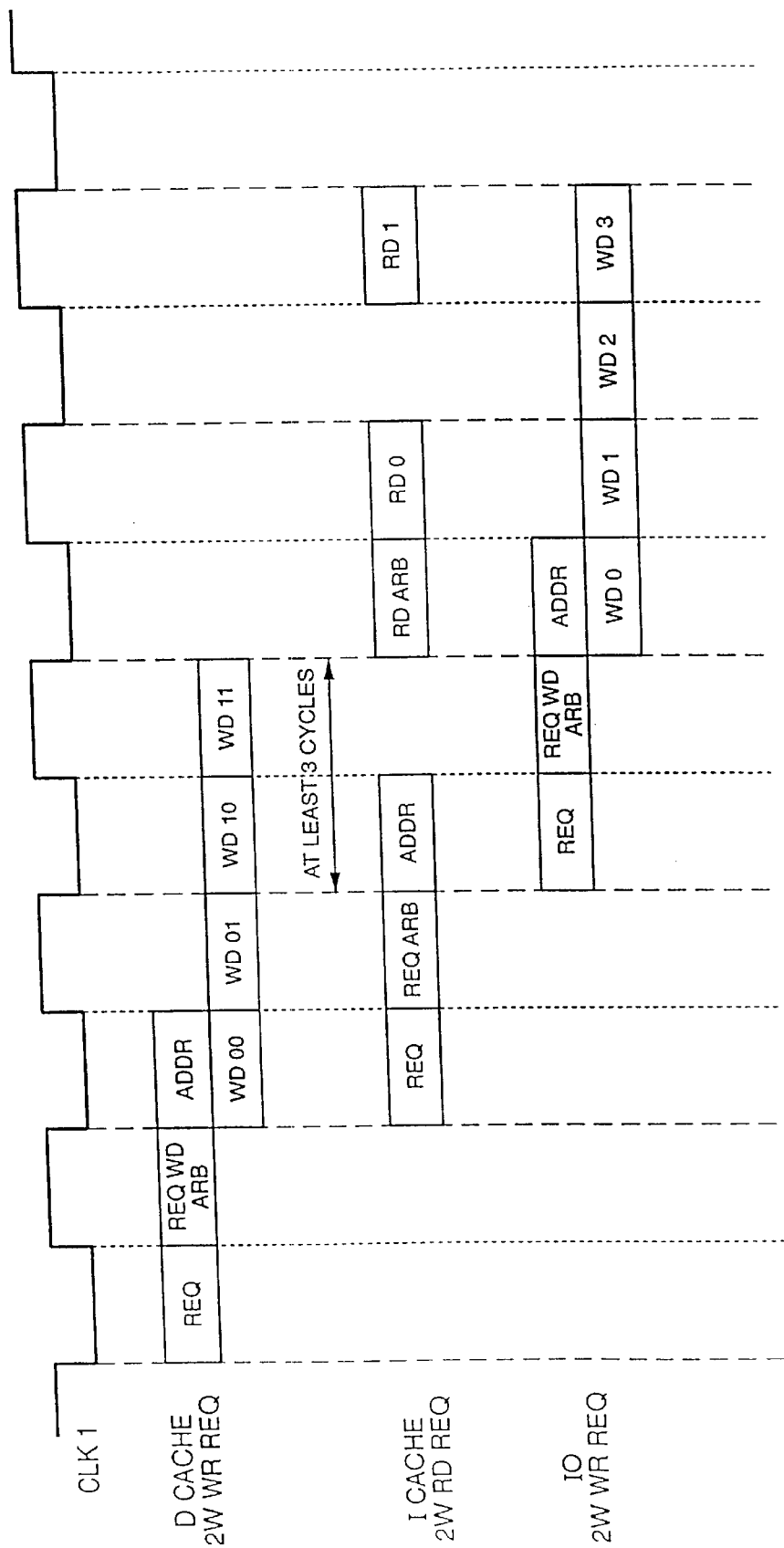
FIG._8

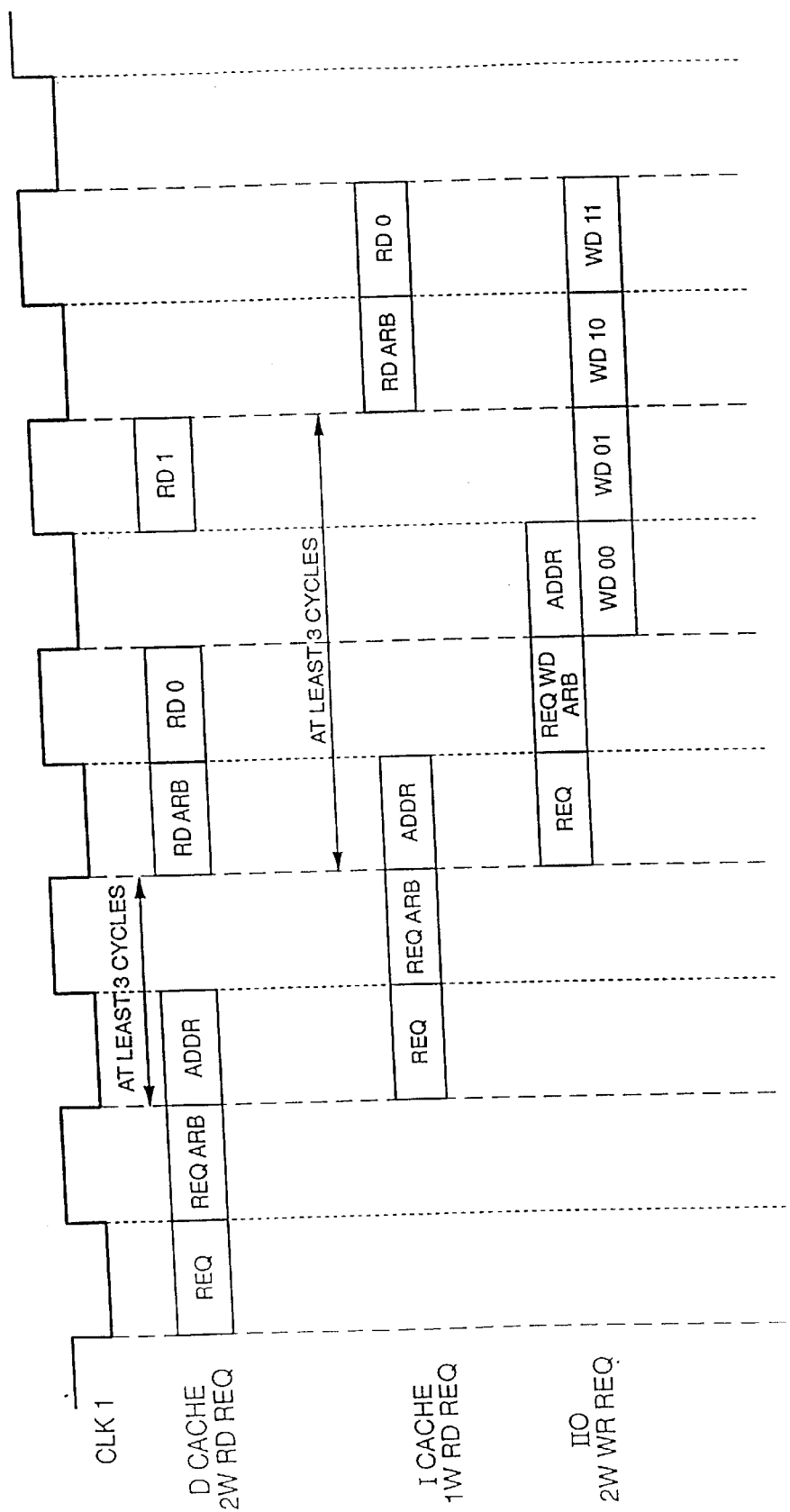
FIG._9

MICROPROCESSOR ARCHITECTURE CAPABLE OF SUPPORTING MULTIPLE HETEROGENEOUS PROCESSORS

CROSS-REFERENCE TO RELATED APPLICATIONS

The present application is a continuation of Ser. No. 09/253,761, filed Feb. 22, 1999 now U.S. Pat. No. 6,272,579 which is a divisional application of Ser. No. 08/915,913, filed Aug. 21, 1997, now U.S. Pat. No. 5,941,979, which is a continuation application of Ser. No. 08/442,649 filed May 16, 1995, now U.S. Pat. No. 5,754,800, which is a divisional application of 07/726,893 filed Jul. 8, 1991, now U.S. Pat. No. 5,440,752. The present application is also related to the following applications, all assigned to the Assignee of the present invention:

1. HIGH-PERFORMANCE RISC MICROPROCESSOR ARCHITECTURE, invented by Le Nguyen et al, SMOS-7984MCF/GBR, application Ser. No. 07/727,066, filed Jul. 8, 1991, now abandoned;
2. EXTENSIBLE RISC MICROPROCESSOR ARCHITECTURE, invented by Quang Trang et al, SMOS-7985MCF/GBR, application Ser. No. 07/727,058, filed Jul. 8, 1991, now abandoned;
3. RISC MICROPROCESSOR ARCHITECTURE WITH ISOLATED ARCHITECTURAL DEPENDENCIES, invented by Yoshi Miyayama, SMOS-7987MCF/GBR/RCC, application Ser. No. 07/726,744, filed Jul. 8, 1991, now abandoned:
4. RISC MICROPROCESSOR ARCHITECTURE IMPLEMENTING MULTIPLE TYPED REGISTER SETS, invented by Sanjiv Garg, SMOS-7988MCF/GBR/RCC, application Ser. No. 07/726,773, filed Jul. 8, 1991, now U.S. Pat. No. 5,493,687;
5. RISC MICROPROCESSOR ARCHITECTURE IMPLEMENTING FAST TRAP AND EXCEPTION STATE, invented by Quang Trang et al, SMOS-7989MCF/GBR/WSW, application Ser. No. 07/726,942, filed Jul. 8, 1991, now abandoned;
6. SINGLE CHIP PAGE PRINTER CONTROLLER, invented by Derek J. Lentz, SMOS-7991MCF/GBR/HKW, application Ser. No. 07/726,929, filed Jul. 8, 1991, now abandoned;

BACKGROUND OF THE INVENTION

1. Field of the Invention

The present invention relates to microprocessor architecture in general and in particular to a microprocessor architecture capable of supporting multiple heterogeneous microprocessors.

2. Description of the Related Art

A computer system comprising a microprocessor architecture capable of supporting multiple processors typically comprises a memory, a memory system bus comprising data, address and control signal buses, an input/output I/O bus comprising data, address and control signal buses, a plurality of I/O devices and a plurality of microprocessors. The I/O devices may comprise, for example, a direct memory access (DMA) controller-processor, an ethernet chip, and various other I/O devices. The microprocessors may comprise, for example, a plurality of general purpose processors as well as special purpose processors. The processors are coupled to the memory by means of the memory system bus and to the I/O devices by means of the I/O bus.

To enable the processors to access the MAU and the I/O devices without conflict, it is necessary to provide a mechanism which assigns a priority to the processors and I/O devices. The priority scheme used may be a fixed priority scheme or a dynamic priority scheme which allows for changing priorities on the fly as system conditions change, or a combination of both schemes. It is also important to provide in such a mechanism a means for providing ready access to the memory and the I/O devices by all processors in a manner which provides for minimum memory and I/O device latency while at the same time providing for cache coherency. For example, repeated use of the system bus to access semaphores which are denied can significantly reduce system bus bandwidth. Separate processors cannot be allowed to read and write the same data unless precautions are taken to avoid problems with cache coherency.

SUMMARY OF THE INVENTION

In view of the foregoing, a principal object of the present invention is a computer system comprising a microprocessor architecture capable of supporting multiple heterogenous processors which are coupled to multiple arrays of memory and a plurality of I/O devices by means of one or more I/O buses. The arrays of memory are grouped into subsystems with interface circuits known as Memory Array Units or MAU's. In each of the processors there is provided a novel memory control unit (MCU). Each of the MCU's comprises a switch network comprising a switch arbitration unit, a data cache interface circuit, an instruction cache interface circuit, an I/O interface circuit and one or more memory port interface circuits known as ports, each of said port interface circuits comprising a port arbitration unit.

The switch network is a means of communication between a master and a slave device. To the switch, the possible master devices are a D-cache, an I-cache, or an I/O controller unit (IOU) and the possible slave devices are a memory port or an IOU.

The function of the switch network is to receive the various instructions and data requests from the cache controller units (CCU) (I-cache, D-cache) and the IOU. After having received these requests, the switch arbitration unit in the switch network and the port arbitration unit in the port interface circuit prioritizes the requests and passes them to the appropriate memory port (depending on the instruction address). The port, or ports as the case may be, will then generate the necessary timing signals, receive or send the necessary data to/from the MAU. If it is a write (WR) request, the interaction between the port and the switch stops when the switch has pushed all the write data into the write data FIFO (WDF) from the switch. If it is a read (RD) request, the interaction between the switch and the port only ends when the port has sent the read data back to the requesting master through the switch.

The switch network is composed of four sets of tri-state buses that provide the connection between the cache, IOU and the memory ports. The four sets of tri-state buses comprise SW_REQ, SW_WD, SW_RD and SW_IDBST. In a typical embodiment of the present invention, the bus SW_REQ comprises 29 wires which is used to send the address, ID and share signal from a master device to a slave device. The ID is a tag associated with a memory request so that the requesting device is able to associate the returning data with the correct memory address. The share signal is a signal indicating that a memory access is to shared memory. When the master device is issuing a request to a slave, it is not necessary to send the full 32 bits of address on the switch. This is because in a multimemory port structure, the switch would have decoded the address and would have known whether the request was for memory port 0, port 1 or the IOU, etc. Since each port has a pre-defined memory space allotted to it, there is no need to send the full 32 bits of address on SW_REQ.

In practice, other request attributes such as, for example, a function code and a data width attribute are not sent on the SW_REQ because of timing constraints. If the information were to be carried over the switch, it would arrive at the port one phase later than needed, adding more latency to memory requests. Therefore, such request attributes are sent to the port on dedicated wires so that the port can start its state machine earlier and thereby decrease memory latency.

Referring to FIG. 8, the bus SW_WD comprises 32 wires and is used to send the write data from the master device (D-cache and IOU) to the FIFO at the memory port. It should be noted that the I-cache reads data only and does not write data. This tri-state bus is "double-pumped" which means that a word of data is transferred on each clock phase, reducing the wires needed, and thus the circuit costs. WD00, WD01, WD10 and WD11 are words of data. Since the buses are double-pumped, care is taken to insure that there is no bus conflict when the buses turn around and switch from a master to a new master.

Referring to FIG. 9, the bus SW_RD comprises 64 wires and is used to send the return read data from the slave device (memory port and IOU) back to the master device. Data is only sent during one phase 1. This bus is not double-pumped because of timing constraints of the caches in that the caches require that the data be valid at the falling edge of CLK1. Since the data is not available from the port until phase 1 when clock 1 is high, if an attempt were made to double-pump the SW_RD bus, the earliest that a cache would get the data is at the positive edge of CLK1 and not the negative edge thereof. Since bus SW_RD is not double-pumped, this bus is only active (not tri-stated) during phase 2. There is no problem with bus driver conflict when the bus switches to a different master.

The bus SW_IDBST comprises four wires and is used to send the identification (ID) from a master to a slave device and the ID and bank start signals from the slave to the master device.

In a current embodiment of the present invention there is only one ID FIFO at each slave device. Since data from a slave device is always returned in order, there is no need to send the ID down to the port. The ID could be stored in separate FIFO's, one FIFO for each port, at the interface between the switch and the master device. This requires an increase in circuit area over the current embodiment since each interface must now have n FIFO's if there are n ports, but the tri-state wires can be reduced by two.

The port interface is an interface between the switch network and the external memory (MAU). It comprises a port arbitration unit and means for storing requests that cause interventions and interrupted read requests. It also includes a snoop address generator. It also has circuits which act as signal generators to generate the proper timing signals to control the memory modules.

There are several algorithms which are implemented in apparatus in the switch network of the present invention including a test and set bypass circuit comprising a content addressable memory (CAM), a row match comparison circuit and a dynamic switch/port arbitration circuit.

The architecture implements semaphores, which are used to synchronize software in multiprocessor systems, with a "test and set" instruction as described below. Semaphores are not cached in the architecture. The cache fetches the semaphore from the MCU whenever the CPU executes a test and set instruction.

The test and set bypass circuit implements a simple algorithm that prevents a loss of memory bandwidth due to spin-locking, i.e. repeated requests for access to the MAU system bus, for a semaphore. When a test instruction is executed on a semaphore which locks a region of memory, device or the like, the CAM stores the address of the semaphore. This entry in the CAM is cleared when any processor performs a write to a small region of memory enclosing the semaphore. If the requested semaphore is still resident in the CAM, the semaphore has not been released by another processor and therefore there is no need to actually access memory for the semaphore. Instead, a block of logical 1's ($FFFF's) (semaphore failed) is sent back to the requesting cache indicating that the semaphore is still locked and the semaphore is not actually accessed, thus saving memory bandwidth.

A write of anything other than all 1's to a semaphore clears the semaphore. The slave CPU then has to check the shared memory bus to see if any CPU (including itself) writes to the relevant semaphore. If any CPU writes to a semaphore that matches an entry in the CAM, that entry in the CAM is cleared. When a cache next attempts to access the semaphore, it will not find that entry in the CAM and will then actually fetch the semaphore from main memory and set it to failed, i.e. all 1's.

The function of the row match comparison circuit is to determine if the present request has the same row address as the previous request. If it does, the port need not de-assert RAS and incur a RAS pre-charge time penalty. Thus, memory latency can be reduced and usable bandwidth increased. Row match is mainly used for dynamic random access memory (DRAM) but it can also be used for static random access memory (SRAM) or read-only memory (ROM) in that the MAU now need not latch in the upper bits of a new address. Thus, when there is a request for access to the memory, the address is sent on the switch network address bus SW_REQ, the row address is decoded and stored in a MUX latch. If this address is considered the row address of a previous request, when a cache or an IOU issues a new request, the address associated with the new address is decoded and its row address is compared with the previous row address. If there is a match, a row match hit occurs and the matching request is given priority as explained below.

In the dynamic switch/port arbitration circuit, two different arbitrations are performed. One is for arbitrating for the resources of the memory ports, i.e. port 0 . . . port N, and the other is an arbitration for the resources of the address and write data buses of the switch network, SW_REQ and SW_WD, respectively.

Several devices can request data from main memory at the same time. They are the D- and I-cache and the IOU. A priority scheme whereby each master is endowed with a certain priority is set up so that the requests from more "important" or "urgent" devices are serviced as soon as possible. However, a strict fixed arbitration scheme is not used due to the possibility of starving the lower priority devices. Instead, a dynamic arbitration scheme is used which allocates different priorities to the various devices on the fly. This dynamic scheme is affected by the following factors:

1. Intrinsic priority of the device.
2. Does the requested address have a row match with the previously serviced request?
3. Has the device been denied service too many times?
4. Has that master been serviced too many times?

Each request from a device has an intrinsic priority. IOU has the highest priority followed by the D- and I-cache, respectively. An intervention (ITV) request as described below, from the D-cache, however, has the highest priority of all since it is necessary that the slave processing element (PE) has the updated data as soon as possible.

The intrinsic priority of the various devices is modified by several factors. The number of times a lower priority device is denied service is monitored and when such number reaches a predetermined number, the lower priority device is given a higher priority. In contrast, the number of times a device is granted priority is also monitored so that if the device is a bus "hog", it can be denied priority to allow a lower priority device to gain access to the bus. A third factor used for modifying the intrinsic priority of a request is row match. Row match is important mainly for the I-cache. When a device requests a memory location which has the same row address as the previously serviced request, the priority of the requesting device is increased. This is done so as to avoid having to de-assert and re-assert RAS. Each time a request is serviced because of a row match, a programmable counter is decremented. Once the counter reaches zero, for example, the row match priority bit is cleared to allow a new master to gain access to the bus. The counter is again pre-loaded with a programmable value when the new master of the port is different from the old master or when a request is not a request with a row match.

A write request for a memory port will only be granted when the write data bus of the switch network (SW_WD) is available. If it is not available, some other request is selected. The only exception is for an intervention (ITV) request from the D-cache. If such a request is present and the SW_WD bus is not available, no request is selected. Instead, the system waits for the SW_WD bus to become free and then the intervention request is granted.

Two software-selectable arbitration schemes for the switch network are employed. They are as follows:
1. Slave priority in which priority is based on the slave or the requested device (namely, memory or IOU port).
2. Master priority which is based on the master or the requesting device (namely, IOU, D- and I-cache).

In the slave priority scheme, priority is always given to the memory ports, e.g. port 0, 1, 2 . . . first, then to the IOU and then back to port 0, a scheme generally known as a round robin scheme. The master priority scheme is a fixed priority scheme in which priority is given to the IOU and then to the D- and I-caches respectively. Alternatively, an intervention (ITV) request may be given the highest priority under the master priority scheme in switch arbitration. Also, an I-cache may be given the highest priority if the pre-fetch buffer is going to be empty soon.

BRIEF DESCRIPTION OF THE DRAWINGS

The above and other objects, features and advantages of the present invention will become apparent from the following detailed description of the accompanying drawings, in which:

FIG. 1 is a block diagram of a microprocessor architecture capable of supporting multiple heterogeneous microprocessors according to the present invention;

FIG. 2 is a block diagram of a memory control unit according to the present invention;

FIG. 3 is a block diagram of a switch network showing interconnects between a D-cache interface and a port interface according to the present invention;

FIG. 4 is a block diagram of a test and set bypass circuit according to the present invention;

FIG. 5 is a block diagram of a circuit used for generating intervention signals and arbitrations for an MAU bus according to the present invention;

FIG. 6 is a block diagram of a row match comparison circuit according to the present invention; and FIG. 7 is a diagram of a dynamic arbitration scheme according to the present invention.

FIG. 8 is a diagram showing the timing of a write request; and

FIG. 9 is a diagram showing the timing of a read request.

DETAILED DESCRIPTION OF THE DRAWINGS

Referring to FIG. 1, there is provided in accordance with the present invention a microprocessor architecture designated generally as 1. In the architecture 1 there is provided a plurality of general purpose microprocesors 2, 3, 4 . . . N, a special purpose processor 5, an arbiter 6 and a memory/memory array unit (MAU) 7. The microprocessors 2–N may comprise a plurality of identical processors or a plurality of heterogeneous processors. The special purpose processor 5 may comprise, for example, a graphics controller. All of the processors 2–5 are coupled via one or more memory ports $PORT_0$ . . . $PORT_N$ to an MAU system bus 25 comprising an MAU data bus 8, a ROW/COL address bus 9, a multiprocessor control bus 10, an MAU control bus 11 and a bus arbitration control signal bus 12 by means of a plurality of bidirectional signal buses 13–17, respectively. The bus 12 is used, for example, for requesting arbitration to access and for granting or indicating that the system data bus 8 is busy. The arbiter 6 is coupled to the bus 12 by means of a bidirectional signal line 18. The MAU 7 is coupled to the ROW/COL address and memory control buses 9 and 11 for transferring signals from the buses to the MAU by means of unidirectional signal lines 19 and 20 and to the MAU data bus 8 by means of bidirectional data bus 21. Data buses 8 and 21 are typically 64 bit buses; however, they may be operated as 32 bit buses under software control. The bus may be scaled to other widths, e.g. 128 bits.

Each of the processors 2–N typically comprises an input/output IOU interface 53, which will be further described below with respect to FIG. 2, coupled to a plurality of peripheral I/O devices, such as a direct memory access (DMA) processor 30, an ETHERNET interface 31 and other I/O devices 32 by means of a 32 bit I/O bus 33 or an optional 32 bit I/O bus 34 and a plurality of 32 bit bidirectional signal buses 35–42. The optional I/O bus 34 may be used by one or more of the processors to access a special purpose I/O device 43.

Referring to FIG. 2, each of the processors 2–N comprises a memory control unit (MCU) designated generally as 50, coupled to a cache control unit (CCU) 49 comprising a data (D) cache 51 and an instruction (I) cache 52 and an I/O port 53, sometimes referred to herein simply as IOU, coupled to the I/O bus 33 or 34.

The MCU 50 is a circuit whereby data and instructions are transferred (read or written) between the CCU 49, i.e. both the D-cache 51 and the I-cache 52 (read only), the IOU 53 and the MAU 7 via the MAU system bus 25. The MCU 50, as will be further described below, provides cache coherency. Cache coherency is achieved by having the MCU in each slave CPU monitor, i.e. snoop, all transactions of a master CPU on the MAU address bus 9 to determine whether the cache in the slave CPU has to request new data provided by the master CPU or send new data to the master CPU. The MCU 50 is expandable for use with six memory ports and can support up to four-way memory interleave on the MAU data bus 8. It is able to support the use of an external 64- or 32-bit data bus 8 and uses a modified hamming code to correct one data bit error and detect two or more data bit errors.

In the architecture of the present invention, cache sub-block, i.e. cache line, size is a function of memory bus size. For example, if the bus size is 32 bits, the sub-block size is typically 16 bytes. If the bus size is 64 bits, the sub-block size is typically 32 bytes. If the bus size is 128 bits, the sub-block size is 64 bytes. As indicated, the MCU 50 is designed so that it can be programmed to support 1, 2 or 4-way interleaving, i.e. number of bytes transferred per cycle.

In the MCU 50 there is provided one or more port interfaces designated port $P_0$ . . . $P_N$, a switch network 54, a D-cache interface 55, an I-cache interface 56 and an I/O interface 57. As will be further described below with respect to FIG. 3, each of the port interfaces $P_0$–$P_N$ comprises a port arbitration unit designated, respectively, $PAU_0$ . . . $PAU_N$. The switch network 54 comprises a switch arbitration unit 58.

When the MCU 50 comprises two or more port interfaces, each of the port interfaces $P_0$–$P_N$ is coupled to a separate MAU system bus, which is identical to the bus 25 described above with respect to FIG. 1. In FIG. 2, two such buses are shown designated $25_0$ and $25_N$. The bus $25_N$ comprises buses $8_N$, $9_N$, $10_N$, $11_N$ and $12_N$ which are connected to port $P_N$ by buses $13_N$, $14_N$, $15_N$, $16_N$ and $17_N$, respectively. Buses $8_N$–$17_N$ are identical to buses 8–17 described above with respect to FIG. 1. Similarly, each of the port interfaces are coupled to the switch network 54 by means of a plurality of separate identical buses including write (WR) data buses 60, $60_N$, read (RD) data buses 61, $61_N$, and address buses 62, $62_N$ and to each of the cache and I/O interfaces 55, 56, 57 by means of a plurality of control buses 70, 71, 80, 81, 90 and 91 and $70_N$, $71_N$, $80_N$, $81_N$, $90_N$ and $91_N$, where the subscript N identifies the buses between port interface $P_N$ and the cache and I/O interfaces.

The switch network 54 and the D-cache interface 55 are coupled by means of a WR data bus 72, RD data bus 73 and an address bus 74. The switch network 54 and the I-cache interface 56 are coupled by means of an RD data bus 82 and an address bus 83. It should be noted that the I-cache 52 does not issue write (WR) requests. The switch network 54 and the I/O interface 57 are coupled by means of a plurality of bidirectional signal buses including an RD data bus 92, a WR data bus 93 and an address bus 94.

The D-cache interface 55 and the CCU 49, i.e. D-cache 51, are coupled by means of a plurality of unidirectional signal buses including a WR data bus 100, an RD data bus 101, an address bus 102 and a pair of control signal buses 103 and 104. The I-cache interface 56 and the CCU 49, i.e. I-cache 52, are coupled by means of a plurality of unidirectional signal buses including an RD data bus 110, an address bus 111, and a pair of control signal buses 112 and 113. The I/O interface 57 and the IOU 53 are coupled by means of a plurality of unidirectional signal buses including an R/W-I/O master data bus 120, an R/W-I/O slave data bus 121, a pair of control signal lines 123 and 124 and a pair of address buses 125 and 126. The designations I/O master and I/O slave are used to identify data transmissions on the designated signal lines when the I/O is operating either as a master or as a slave, respectively, as will be further described below.

Referring to FIG. 3, there is provided a block diagram of the main data path of the switch network 54 showing the interconnections between the D-cache interface 55 and port interface $p_0$. Similar interconnects are provided for port interfaces $P_1$–$P_N$ and the I-cache and I/O interfaces 56, 57 except that the I-cache interface 56 does not issue write data requests. As shown in FIG. 3, there is further provided in each of the port interfaces $P_0$–$P_N$ an identification (ID) first in, first out (FIFO) 130 which is used to store the ID of a read request, a write data (WD) FIFO 131 which is used to temporarily store write data until access to the MAU is available and a read data (RD) FIFO 132 which is used to temporarily store read data until the network 54 is available.

In the switch network 54 there is provided a plurality of signal buses 140–143, also designated, respectively, as request/address bus SW_REQ[28:0], write data bus SW_WD[31:0], read data bus SW_RD[63:0] and identification/bank start signal bus SW_IDBST[3:0] and the switch arbitration unit 58. The switch arbitration unit 58 is provided to handle multiport I/O requests.

The cache and port interface are coupled directly by some control signal buses and indirectly by others via the switch network buses. For example, the port arbitration unit PAU in each of the port interfaces $P_0$–$P_N$ is coupled to the switch arbitration unit 58 in the switch network 54 by a pair of control signal buses including a GRANT control line 70a and a REQUEST control line 71a. The switch arbitration unit 58 is coupled to the D-cache interface 55 by a GRANT control signal line 71b. Lines 70a and 70b and lines 71a and 71b are signal lines in the buses 70 and 71 of FIG. 2. A gate 75 and registers 76 and 78 are also provided to store requests that cause interventions and to store interrupted read requests, respectively. Corresponding control buses are provided between the other port, cache and I/O interfaces.

The function of the switch network 54 is to receive the various instructions and data requests from the cache control units (CCU), i.e. (I-cache 51, D-cache 52, and the IOU 53. In response to receiving the requests, the switch arbitration unit 58 in the switch network 54 which services one request at a time, prioritizes the requests and passes them to the appropriate port interface $P_0$–$P_N$ or I/O interface depending upon the address accompanying the request. The port and I/O interfaces are typically selected by means of the high order bits in the address accompanying the request. Each port interface has a register 77 for storing the MAU addresses. The port interface will then generate the necessary timing signals and transfer the necessary data to/from the MAU 7. If the request is a WR request, the interaction between the port interface and the switch network 54 stops when the switch has pushed all of the write data into the WDF (write data FIFO) 131. If it is a RD request, the interaction between the switch network 54 and the port interface only ends when the port interface has sent the read data back to the switch network 54.

As will be further described below, the switch network 54 is provided for communicating between a master and a slave device. In this context, the possible master devices are:

1. D-cache
2. I-cache
3. IOU and the possible slave devices are:

1. memory port
2. IOU

The switch network 54 is responsible for sending the necessary intervention requests to the appropriate port interface for execution.

As described above, the switch network 54 comprises four sets of tri-state buses that provide the connection between the cache, I/O and memory port interfaces. The four sets of tri-state buses are SW_REQ, SW_WD, SW_RD and SW_IDBST. The bus designated SW_REQ[28:0] is used to send the address in the slave device and the memory share signal and the ID from the master device to the slave device. As indicated above, the master may be the D-cache, I-cache or an IOU and the slave device may be a memory port or an IOU. When the master device is issuing a request to a slave, it is not necessary to send the full 32 bits of address on the switch bus SW_REQ. This is because in the multiple memory port structure of the present invention, each port has a pre-defined memory space allotted to it.

Other request attributes such as the function code (FC) and the data width (WD) are not sent on the SW_REQ bus because of timing constraints. The information carried over the switch network 54 arrives at the port interface one clock phase later than the case if the information has been carried on dedicated wires. Thus, the early request attributes need to be sent to the port interface one phase earlier so that the port interface can start its state machine earlier and thereby decrease memory latency. This is provided by a separate signal line 79, as shown in FIG. 3. Line 79 is one of the lines in the control signal bus 70 of FIG. 2.

The SW_WD[31:0] bus is used to send write data from the master device (D cache and IOU) to the WD FIFO 131 in the memory port interface. This tri-state bus is double-pumped, which means that 32 bits of data are transferred every phase. Since the buses are double-pumped, care is taken in the circuit design to insure that there is no bus-conflict when the buses turn around and switch from one master to a new master. As will be appreciated, double-pumping reduces the number of required bit lines thereby minimizing expensive wire requirements with minimal performance degradation.

Referring to FIG. 9, the SW_RD[63:0] bus is used to send the return read data from the slave device (memory port or IOU) back to the master device. Data is sent only during phase 1 of the clock (when CLK1 is high). This bus is not double-pumped because of a timing constraint of the cache. The cache requires that the data be valid at the falling edge of CLK1. Since the data is received from the port interface during phase 1, if the SW_RD bus was double-pumped, the earliest that the cache would get the data would be at the positive edge of CLK1, not at the negative edge of CLK1. Since the SW_RD bus is not double-pumped, this bus is only active (not tri-stated) during CLK1 and there is no problem with bus buffer conflict where two bus drivers drive the same wires at the same time.

The SW_IDBST[3:0] is used to return the identification (ID) code and a bank. start code from the slave to the master device via the bus 88. Since data from a slave device is always returned in order, there is generally no need to send the ID down to the port. The ID can be stored in separate FIFO's, one FIFO for each port in the interface.

Referring again to the read FIFO 132, data is put into this FIFO only when the switch read bus SW_RD is not available. If the bus SW_RD is currently being used by some other port, the oncoming read data is temporarily pushed into the read FIFO 132 and when the SW_RD bus is released, data is popped from the FIFO and transferred through the switch network 54 to the requesting cache or IOU.

The transfer of data between the D-cache interface 55, the I-cache interface 56, the I/O interface 57 and the port interfaces $P_0$–$P_N$ will now be described using data transfers to/from the D-cache interface 55 as an example.

When one of the D-cache, I-cache or IOU's wants to access a port, it checks to see if the port is free by sending the request to the port arbitration unit $PAU_0$ on the request signal line 70b as shown in FIG. 3. If the port is free, the port interface informs the switch arbitration unit 58 on the request control line 71a that there is a request. If the switch network 54 is free, the switch arbitration unit 58 informs the port on the grant control line 70a and the master, e.g. D-cache interface 55, that the request is granted on the control line 71b.

If the request is a write request, the D-cache interface circuit 55 checks the bus arbitration control unit 172 to determine whether the MCU 50 is granted the MAU bus 25. If the MCU has not been granted the bus 25, a request is made for the bus. If and when the bus is granted, the port arbitration unit 171 makes a request for the switch buses 140, 141. After access to the switch buses 140, 141 is granted, the D-cache interface circuit 55 places the appropriate address on the switch bus SW_REQ 140 and at the same time places the write data on the write data bus SW_WD 141 and stores it in the WD FIFO (WDF) 131. When the data is in the WDF, the MCU subsequently writes the data to the MAU. The purpose of making sure that the bus is granted before sending the write data to the port is so that the MCU need not check the WDF when there is a snoop request from an external processor. Checking for modified data therefore rests solely on the cache.

If the request is a read request, and the port and switch network are determined to be available as described above, the port interface receives the address from the requesting unit on the SW_REQ bus and arbitrates using the arbiter for the MAU bus 9. The MAU arbiter informs the port that the MAU bus has been granted to it before the bus can actually be used. The request is then transferred to the port by the switch. When the MAU address bus 9 is free, the address is placed on the MAU address bus. The port knows, ahead of time, when data will be received. It requests the switch return data bus so that it is available when the data returns, if it is not busy. When the bus is free, the port puts the read data on the bus which the D-cache, I-cache or I/O interface will then pick up and give to its respective requesting unit.

If the D/I-cache 51,52 makes a request for an I/O address, the D/I-cache interface 55,56 submits the request to the I/O interface unit 57 via the request bus SW_REQ. If the I/O interface unit 57 has available entries in its queues for storing the requests, it will submit the request to the switch arbitration unit 58 via the control signal line 90. Once again, if the switch network 54 is free, the switch arbitration unit 58 informs the D/I cache interface 55,56 so that it can place the address on the address bus SW_REQ and, if it is a write request (D cache only), the write data on the write data bus SW_WD for transfer to the IOU. Similarly, if the request from the D/I cache interface 55,56 is a read request, the read data from the I/O interface 57 is transferred from the I/O interface 57 via the switch network 54 read data bus SW_RD and provided to the D/I cache interface 55,56 for transfer to the D/I cache 51,52.

Referring to FIG. 4, there is further provided in the port interfaces and caches in accordance with the present invention test and set (TS) bypass circuits designated generally as 160 and 168, respectively, for monitoring, i.e., snooping, for addresses of semaphores on the MAU address bus 9. As will be seen, the circuits 160, 168 reduce the memory bandwidth consumed by spin-locking for a semaphore.

In the TS circuits 160, 168 there is provided a snoop address generator 161, a TS content addressable memory (CAM) 162, a flip-flop 163 and MUX's 164 and 165.

A semaphore is a flag or label which is stored in an addressable location in memory for controlling access to certain regions of the memory or other addressable resources. When a CPU is accessing a region of memory with which a semaphone is associated, for example, and does not want to have that region accessed by any other CPU, the accessing CPU places all 1's in the semaphore. When a second CPU attempts to access the region, it first checks the semaphore. If it finds that the semaphore comprises all 1's, the second CPU is denied access. Heretofore, the second CPU would repeatedly issue requests for access and could be repeatedly denied access, resulting in what is called "spin-locking for a semaphore". The problem with spin-locking for a semaphore is that it uses an inordinate amount of memory bandwidth because for each request for access, the requesting CPU must perform a read and a write.

The Test and Set bypass circuits 160, 168 of FIG. 4 are an implementation of a simple algorithm that reduces memory bandwidth utilization due to spin-locking for a semaphore.

In operation, when a CPU, or more precisely, a process in the processor, first requests access to a memory region with which a semaphore is associated by issuing a load-and-set instruction, i.e. a predetermined instruction associated with a request to access a semaphore, the CPU first accesses the semaphore and stores the address of the semaphore in the CAM 162. Plural load-and-set instructions can result in plural entries being in the CAM 162. If the semaphore contains all 1's ($FFFF's), the 1's are returned indicating that access is denied. When another process again requests for the semaphore, it checks its CAM. If the address of the requested semaphore is still resident in the CAM, the CPU knows that the semaphore has not been released by another processor/process and there is therefore no need to spin-lock for the semaphore. Instead, the MCU receives all 1's (semaphore failed) and the semaphore is not requested from memory; thus, no memory bandwidth is unnecessarily used. On the other hand, if the semaphore address is not in the CAM, this means that the semaphore has not been previously requested or that it has been released.

The MAU bus does not provide byte addresses. The CAM must be cleared if the semaphore is released. The CAM is cleared if a write to any part of the smallest detectable memory block which encloses the semaphore is performed by any processor on the MAU bus. The current block size is 4 or 8 bytes. In this way, the CAM will never hold the address of a semaphore which has been cleared, although the CAM may be cleared when the semaphore has not been cleared by a write to another location in the memory block. The semaphore is cleared when any processor writes something other than all 1's to it.

If a semaphore is accessed by a test and set instruction after a write has occurred to the memory block containing the semaphore, the memory is again accessed. If the semaphore was cleared, the cleared value is returned to the CPU and the CAM set with the address again. If the semaphore was not cleared or was locked again, the CAM is also loaded with the semaphore address, but the locked value is returned to the CPU.

In the operation of the circuit 160 of FIG. 4, the circuit 160 snoops the MAU address bus 9 and uses the address signals detected thereon to generate a corresponding snoop address in the address generator 161 which is then sent on line 169 to, and compared with, the contents of the CAM 162. If there is a hit, i.e. a match with one of the entries in the CAM 162, that entry in the CAM 162 is cleared. When a load and set request is made to the MCU from, for example, a D-cache, the D-cache interface circuit compares the address with entries in the CAM. If there is a hit in the CAM 162, the ID is latched into the register 163 in the cache interface and this ID and all 1's ($FFFF) are returned to the cache interface by means of the MUX's 164 and 165.

The snooping of the addresses and the generation of a snoop address therefrom in the snoop address generator 161 for comparison in the CAM 162 continues without ill effect even though the addresses appearing on the MAU address bus 9 are to non-shared memory locations. The snoop address generator 161 typically generates a cache block address (high order bits) from the 11 bits of the MAU row and column addresses appearing on the MAU address bus 9 using the MAU control signals RAS, CAS and the BKST START MAU control signals on the control signal bus 11.

Referring to FIG. 5, there is provided in accordance with another aspect of the present invention a circuit designated generally as 170 for providing cache coherency. Cache coherency is necessary to insure that in a multiprocessor environment the master and slave devices, i.e. CPU's, all have the most up-to-date data.

Shown outside of the chip comprising the circuit 170, there is provided the arbiter 6, the memory 7 and the MAU address bus 9, MAU control bus 11 and multiprocessor control bus 10. In the circuit 170 there is provided a port arbitration unit interface 171, a bus arbitration control unit 172, a multiprocessor control 173 and the snoop address generator 161 of FIG. 4. The D-cache interface 55 is coupled to the multiprocessor control 173 by means of a pair of control signal buses 174 and 175 and a snoop address bus 176. The I-cache interface 56 is coupled to the multiprocessor control 173 by means of a pair of control signal buses 177 and 178 and the snoop address bus 176. The snoop address generator 161 is coupled to the multiprocessor control 173 by means of a control signal bus 179. The multiprocessor control 173 is further coupled to the multiprocessor control bus 10 by means of a control signal bus 180 and to the bus arbitration control unit 172 by a control signal bus 181. The port arbitration unit interface 171 is coupled to the bus arbitration control unit 172 by a control signal bus 182. The bus arbitration control unit 172 is coupled to the arbiter 6 by a bus arbitration control bus 183. The snoop address generator 161 is also coupled to the MAU address bus 9 and the MAU control bus 11 by address and control buses 14 and 16, respectively.

A request from a cache will carry with it an attribute indicating whether or not it is being made to a shared memory. If it is to a shared memory, the port interface sends out a share signal SHARED_REQ on the multiprocessor control signal (MCS) bus 10. When other CPU's detect the share signal on the MCS bus 10 they begin snooping the MAU ADDR bus 9 to get the snoop address.

Snooping, as briefly described above, is the cache coherency protocol whereby control is distributed to every cache on a shared memory bus, and all cache controllers (CCU's) listen or snoop the bus to determine whether or not they have a copy of the shared block. Snooping, therefore, is the process whereby a slave MCU monitors all the transactions on the bus to check for any RD/WR requests issued by the master MCU. The main task of the slave MCU is to snoop the bus to determine if it has to receive any new data, i.e. invalidate data previously received, or to send the freshest data to the master MCU, i.e. effect an intervention.

As will be further described below, the multiprocessor control circuit 173 of FIG. 5 is provided to handle invalidation, intervention and snoop hit signals from the cache and other processors and generate snoop hit (SNP_HIT) signals and intervention (ITV_REQ) signals on the multiprocessor control signal bus 180 when snoop hits and intervention/invalidation are indicated, as will be further described below.

The bus arbitration control unit 172 of FIG. 5 arbitrates for the MAU bus in any normal read or write operation. It also handles arbitrating for the MAU bus in the event of an intervention/invalidation and interfaces directly with the external bus arbitration control signal pins which go directly to the external bus arbiter 6.

The operations of intervention and invalidation which provide the above-described cache coherency will now be described with respect to read requests, write requests; and read-with-intent-to-modify requests issued by a master central processing unit (MSTR CPU).

When the MSTR CPU issues a read request, it places an address on the memory array unit (MAU) address bus 9. The slave (SLV) CPU's snoop the addresses on the MAU bus 9. If a SLV CPU has data from the addressed memory location in its cache which has been modified, the slave cache control unit (SLV CCU) outputs an intervention signal (ITV) on the multiprocessor control bus 10, indicating that it has fresh, i.e. modified, data. The MSTR, upon detecting the ITV signal, gives up the bus and the SLV CCU writes the fresh data to the main memory, i.e. MAU 7. If the data requested by the MSTR has not been received by the MSTR cache control unit (CCU), the MSTR MCU discards the data requested and re-asserts its request for data from the MAU. If the data requested has been transferred to the MSTR CCU, the MSTR MCU informs the MSTR CCU (or IOU controller, if an IOU is the MSTR) to discard the data. The MSTR MCU then reissues its read request after the slave has updated main memory. Meanwhile, the port interface circuit holds the master's read request while the slave writes the modified data back to memory. Thereafter, the read request is executed.

If the MSTR issues a write request, places an address on the memory array unit (MAU) address bus 9 and a slave CCU has a copy of the original data from this address in its cache, the slave CCU will invalidate, i.e. discard, the corresponding data in its cache.

If the MSTR issues a read-with-intent-to-modify request, places an address on the memory array unit (MAU) address bus 9 and a slave MCU has the address placed on the address bus by the master (MSTR), one of two possible actions will take place:

1. If the SLV CCU has modified the data corresponding to the data addressed by the MSTR, the SLV will issue an ITV signal, the MSTR will give up the bus in response thereto and allow the SLV CCU to write the modified data to memory. This operation corresponds to the intervention operation described above.
2. If the SLV has unmodified data corresponding to the data addressed by the MSTR, the SLV will invalidate, i.e. discard, its data. This operation corresponds to the invalidation operation described above.

Referring to FIG. 6, there is provided in accordance with another aspect of the present invention a circuit designated .generally as 190 which is used for row match comparison to reduce memory latency. In the circuit 190 there is provided a comparator 191, a latch 192 and a pair of MUX's 193 and 194.

The function of the row match comparison is to determine if the present request has the same row address as a previous request. If it does, the port need not incur the time penalty for de-asserting RAS. Row match is mainly used for DRAM but it can also be used for SRAM or ROM in that the MAU need not latch in the upper, i.e. row, bits of the new address, since ROM and SRAM accesses pass addresses to the IAU in high and low address segments in a manner similar to that used by DRAMS.

In the operation of the row match circuitry of FIG. 6, the row address including the corresponding array select bits of the address are stored in the latch 192 by means of the MUX 193. Each time a new address appears on the switch network address bus SW_REQ, the address is fed through the new request MUX 194 and compared with the previous request in the comparator 191. If there is a row match, a signal is generated on the output of the comparator 191 and transferred to the port interface by means of the signal line 195 which is a part of bus 70. The row match hit will prevent the port interface from de-asserting RAS and thereby saving RAS cycle time.

MUX 193 is used to extract the row address from the switch request address. The row address mapping to the switch address is a function of the DRAM configuration (e.g., 1M×1 or 4M×1 DRAM's) and the MAU data bus width (e.g., 32 or 64 bits).

Referring to FIGS. 1 and 5, the external bus arbiter 6 is a unit which consists primarily of a programmable logic array (PLA) and a storage element. It accepts requests for the MAU bus from the different CPU's, decides which of the CPU's should be granted the bus based on a software selectable dynamic or fixed priority scheme, and issues the grant to the appropriate CPU. The storage element is provided to store which CPU was last given the bus so that either the dynamic or flexible priority as well as the fixed or "round robin" priority can be implemented.

Referring to FIG. 7, dynamic switch and port arbitration as used in the multiprocessor environment of the present invention will now be described.

As described above, there are three masters and two resources which an MCU serves. The three masters are D-cache, I-cache and IOU. The two resources, i.e. slaves, are memory ports and IOU. As will be noted, the IOU can be both a master and a resource/slave.

In accordance with the present invention, two different arbitrations are done. One is concerned with arbitrating for the resources of the memory ports (port 0 to port 5) and the other is concerned with arbitrating for the resources of the switch network 54 buses SW_REQ and SW_WD.

Several devices can make a request for data from main memory at the same time. They are the D and I-cache and the IOU. A priority scheme whereby each master is endowed with a certain priority is used so that requests from more "important" or "urgent" devices are serviced as soon as possible. However, a strict fixed arbitration scheme is not preferred due to the possibility of starving lower priority devices. Instead, a dynamic arbitration scheme is implemented which allocates different priority to the various devices on the fly. This dynamic arbitration scheme is affected by the following factors:

1. Intrinsic priority of the device.
2. There is a row match between a requested address and the address of a previously serviced request.
3. A device has been denied service too many times.
4. The master has been serviced too many times.

As illustrated in FIG. 7, the dynamic priority scheme used for requesting the memory port is as follows.

Each request from a device has an intrinsic priority. The IOU may request a high or normal priority, followed by the D and then the I-cache. An intervention (ITV) request from a D-cache, however, has the highest priority of all.

Special high priority I/O requests can be made. This priority is intended for use by real-time I/O peripherals which must have access to memory with the low memory latency. These requests can override all other requests except intervention cycles and row-match, as shown in FIG. 7.

The intrinsic priority of the various devices is modified by several factors, identified as denied service, I/O hog, and row match. Each time a device is denied service, a counter is decremented. Once the counter reaches zero, the priority of the device is increased with a priority level called DENY PRIORITY. These counters can be loaded with any programmable value up to a maximum value of 15. Once the counter reaches zero, a DENY PRIORITY bit is set which is finally cleared when the denied device is serviced. This method of increasing the priority of a device denied service prevents starvation. It should be noted that a denied service priority is not given to an IOU because the intrinsic priority level of the IOU is itself already high.

Since the IOU is intrinsically already a high priority device, it is also necessary to have a counter to prevent it from being a port hog. Every time the IOU is granted use of the port, a counter is decremented. Once the counter reaches zero, the IOU is considered as hogging the bus and the priority level of the IOU is decreased. The dropping of the priority level of the IOU is only for normal priority requests and not the high priority I/O request. When the IOU is not granted the use of the port for a request cycle, the hog priority bit is cleared.

Another factor modifying the intrinsic priority of the request is row match. Row match will be important mainly for the I-cache. When a device requests a memory location which has the same row address as the previously serviced request, the priority of the requesting device is raised. This is done so that RAS need not be reasserted.

There is a limit whereby row match priority can be maintained, however. Once again a counter is used with a programmable maximum value. Each time a request is serviced because of the row match priority, the counter is decremented. Once the counter reaches zero, the row match priority bit is cleared. The counter is again preloaded with a programmable value when a new master of the port is assigned or when there is no request for a row match. The above-described counters are located in the switch arbitration unit 58.

A write request for the memory port will only be granted when the write data bus of the switch SW_WD is available. If it is not available, another request will be selected. The only exception is for the intervention signal ITV. If SW_WD is not available, no request is selected. Instead, the processor waits for SW_WD to be free and then submits the request to the switch arbiter.

The arbitration scheme for the switch network 54 is slightly different than that used for arbitrating for a port. The switch arbitration unit 58 of FIG. 3 utilizes two different arbitration schemes when arbitrating for a port which are selectable by software:

1. Slave priority in which priority is based on the slave or the requested device (namely, memory or IOU port) and
2. Master priority wherein priority is based on the master or the requesting device (namely, IOU, D and I-cache).

In the slave priority scheme priority is always given to the memory ports in a round robin fashion, i.e. memory ports 0, 1, 2 . . . first and then to IOU. In contrast, in the master priority scheme priority is given to the IOU and then to the D and I-cache, respectively. Of course, under certain circumstances it may be necessary or preferable to give the highest priority under the master priority to an ITV request and it may also be necessary or preferable to give I-cache a high priority if the pre-fetch buffer is going to be empty soon. In any event, software is available to adjust the priority scheme used to meet various operating conditions.

Dynamic memory refresh is also based on a priority scheme. A counter coupled to a state machine is used to keep track of how many cycles have expired between refreshes, i.e. the number of times a refresh is requested, and has been denied because the MAU bus was busy. When the counter reaches a predetermined count, i.e. expired, it generates a signal to the port telling the port that it needs to do a refresh. If the port is busy servicing requests from the D or I caches or the IOU, it won't service the refresh request unless it previously denied a certain number of such requests. In other words, priority is given to servicing refresh requests when the refresh requests have been denied a predetermined number of times. When the port is ready to service the refresh request, it then informs the bus arbitration control unit to start arbitrating for the MAU bus.

A row is preferably refreshed every 15 microseconds and must be refreshed within a predetermined period, e.g. at least every 30 microseconds.

When RAS goes low (asserted) and CAS is not asserted, all CPU's know that a refresh has occurred. Since all CPU's keep track of when the refreshes occur, any one or more of them can request a refresh if necessary.

While preferred embodiments of the present invention are described above, it is contemplated that numerous modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

What is claimed is:

1. A memory control unit for controlling access, by one or more devices within a processor, to a memory array unit external to the processor via one or more memory ports of the processor, the memory control unit comprising:
   a switch network to transfer data between the one or more devices of the processor and the one or more memory ports of the processor;
   a switch arbitration unit to arbitrate for access by the one or more devices to said switch network; and
   a port arbitration unit to arbitrate for access by the one or more devices to one of the one or more memory ports.

2. The memory control unit of claim 1, wherein the one or more devices comprise one or more of a data cache, an instruction cache, and an input/output unit.

3. The memory control unit of claim 2, wherein the port arbitration unit dynamically allocates priority to one of the one or more devices as a function of an intrinsic priority assigned to each device, the existence of a row match between a requested address and the address of a previously serviced request, the number of times a device has been denied service, and the number of times a device has been serviced without an interruption.

4. The memory control unit of claim 2, wherein the switch arbitration unit gives priority first to requests for the memory ports and then to requests for the input/output unit in a round robin fashion.

5. The memory control unit of claim 2, wherein the switch arbitration unit gives priority to the input/output unit and then to the data cache and instruction cache.

6. The memory control unit of claim 1, further comprising:
   a first signal line to transfer, to said port arbitration unit, a request to transfer data between one of the devices and the memory array unit via one of the memory ports;
   a second signal line to transfer a port available signal from an available one of the memory ports to said switch arbitration unit when the available port is available to process the request; and a third signal line responsive to the port available signal to transfer a switch available signal from said switch arbitration unit to said port arbitration unit when said switch network is free to process said request.

7. The memory control unit of claim 1, wherein the one or more memory ports are coupled to the memory array unit by a system bus.

8. In a system including a processor and a memory array unit, wherein the processor includes one or more devices and one or more memory ports, a method for controlling access by the one or more devices to the memory array unit via the one or more memory ports, the method comprising:

transferring data between the one or more devices and the one or more memory ports via a switch network;

arbitrating for access by the one or more devices to said switch network; and arbitrating for access by the one or more devices to one of the one or more memory ports.

9. The method of claim 8, wherein the one or more devices comprise one or more of a data cache, an instruction cache, and an input/output unit, and wherein said transferring comprises transferring data between the at least one of the one or more memory ports via said switch network and the at least one of the data cache, the instruction cache, and the input/output unit.

10. The method of claim 8, wherein said arbitrating for the one or more memory ports comprises dynamically allocating priority to one of the one or more devices as a function of an intrinsic priority assigned to each device, the existence of a row match between a requested address and the address of a previously serviced request, the number of times a device has been denied service, and the number of times a device has been serviced without an interruption.

11. The method of claim 8, wherein said arbitrating for said switch network comprises giving priority first to the one or more memory ports and then to the input/output unit in a round robin fashion.

12. The method of claim 8, wherein said arbitrating for said switch network comprises giving priority to the input/output unit and then to the data cache and instruction cache.

* * * * *